(12) United States Patent
Gerhardt et al.

(10) Patent No.: US 12,681,523 B2
(45) Date of Patent: Jul. 14, 2026

(54) JOYSTICK WITH MULTIFUNCTIONAL SUPPORT ELEMENT

(71) Applicant: elobau Gmbh & Co. KG, Leutkirch (DE)

(72) Inventors: Ulrich Gerhardt, Altusried (DE); Simon Caliebe, Isny (DE); Robert Stiehle, Heilbronn (DE)

(73) Assignee: Elobau GmbH & Co. KG, Leutkirch (DE)

( * ) Notice: Subject to any disclaimer, the term of this patent is extended or adjusted under 35 U.S.C. 154(b) by 848 days.

(21) Appl. No.: 17/897,862

(22) Filed: Aug. 29, 2022

(65) Prior Publication Data

US 2023/0062640 A1 Mar. 2, 2023

(30) Foreign Application Priority Data

Aug. 30, 2021 (DE) ..................... 10 2021 122 398.9

(51) Int. Cl.
*G05G 9/047* (2006.01)
*G01K 7/18* (2006.01)
(52) U.S. Cl.
CPC .............. *G05G 9/047* (2013.01); *G01K 7/18* (2013.01); *H05B 2203/013* (2013.01)
(58) Field of Classification Search
CPC ....... G01K 7/18; G05G 9/047; H05B 2203/01
See application file for complete search history.

(56) References Cited

U.S. PATENT DOCUMENTS

| | | | | |
|---|---|---|---|---|
| 2,083,196 | A | * | 6/1937 | Liebmann ................. H01J 1/20 |
| | | | | 313/340 |
| 5,850,741 | A | | 12/1998 | Feher |
| 10,232,858 | B2 | | 3/2019 | Odate |
| 11,136,056 | B2 | | 10/2021 | Wittkowski et al. |
| 2002/0179595 | A1 | * | 12/2002 | Nagele ..................... H05B 3/34 |
| | | | | 219/549 |
| 2014/0339211 | A1 | | 11/2014 | Barfuss et al. |
| 2016/0353524 | A1 | * | 12/2016 | Kim ........................ H05B 3/34 |
| 2017/0129499 | A1 | * | 5/2017 | Odate ............... B60W 60/0053 |
| 2018/0038077 | A1 | * | 2/2018 | Nomura .................. E02F 3/325 |
| 2020/0140076 | A1 | * | 5/2020 | Kuang .................... B64C 27/56 |
| 2021/0157417 | A1 | * | 5/2021 | Mayer .................. H05B 1/0227 |

FOREIGN PATENT DOCUMENTS

| | | | | | |
|---|---|---|---|---|---|
| CN | 107107940 | B | | 4/2020 | |
| DE | 202013002451 | U1 | | 6/2014 | |
| DE | 102013004327 | A1 | | 9/2014 | |
| EP | 0389366 | A1 | * | 9/1990 | .......... B60Q 1/1476 |
| EP | 3227161 | A1 | | 10/2017 | |
| JP | 2016215966 | A | | 12/2016 | |
| KR | 20190030319 | A | | 3/2019 | |

* cited by examiner

*Primary Examiner* — Woody A Lee, Jr.
(74) *Attorney, Agent, or Firm* — Dickinson Wright PLLC

(57) ABSTRACT

A joystick for operating utility vehicles is provided. The joystick has a handle area, and the handle area has a substance-to-substance connection to a support element. At least three conductor elements are arranged on the support element. At least one conductor element is designed as a heating element, one conductor element is designed as a temperature sensor element, and one conductor element is designed as a touch-sensing element.

12 Claims, 5 Drawing Sheets

JOYSTICK WITH MULTIFUNCTIONAL SUPPORT ELEMENT

This U.S. patent application claims priority to German patent application no. 10 2021 122 398.9, filed Aug. 30, 2021, the entire contents of which is incorporated herein by reference in its entirety.

BACKGROUND

1. Technical Field

The present invention relates to a joystick for operating utility vehicles, which has a handle area, wherein the handle area has a substance-to-substance connection to a support element, wherein at least three conductor elements made in particular of identical material are arranged on the support element.

2. Related Art

In utility vehicles, in particular offroad vehicles, such joysticks are normally used to control various movable components of the utility vehicle. Since the latter do not exclusively have closed driver's cabs, or driver's cabs can only be conditionally heated at low outside temperatures, it is necessary to protect the hand of a user resting on the joystick against the cold. While this could basically be done by wearing gloves, these are disadvantageous, since they make it significantly more difficult or even impossible to operate the joystick precisely and accurately. In addition, even wearing gloves cannot preclude cold-related health damage, with the concentration of a user at the very least suffering as the result of clammy or cold hands. Therefore, it is desirable that the hand of a user resting on the joystick be kept warm by heating elements arranged on the joystick.

Such joystick temperature control units are known from prior art. DE 10 2011 121 979 A1 discloses a temperature control device, in particular for a control handle inside of a vehicle, wherein the temperature control device has temperature control strands, which are placed in fixing recesses of a support, and spaced apart from a cover layer in design. This cover layer here at least partially covers the support. A substance-to-substance connection exists between the temperature control device and support, in particular through adhesive bonding. This document also describes a sensor for detecting the temperature and/or contact with a user.

U.S. Pat. No. 10,329,736 B2 describes a bagger, which has two joysticks each with a respective handle area, wherein the handle area has a heating element, which for its part has a heating cable or a flexible heat transfer substrate. One of the joysticks is provided with a temperature sensor. The heating elements can be activated by a control element as a function of the data from the temperature sensor, an active generator, a lockout switch, and a heater switch, as well as a temperature setting preset by the user.

This very complex structure known from prior art comprising the heating element, sensor elements and control elements on a joystick brings with it a high susceptibility to errors, both during the production process, and during use in a highly contaminated and rough environment with large temperature differences. This type of complexity also increases the manufacturing costs.

Therefore, the object of the present invention is to propose a cost-effective and easy to manufacture joystick with a high functional density.

SUMMARY

This object is achieved by a joystick for operating utility vehicles, which has a handle area, wherein the handle area has a substance-to-substance connection to a support element, wherein at least three conductor elements preferably made of identical material are arranged on the support element, wherein at least one conductor element is designed as a heating element, one as a temperature sensor element, and one as a touch-sensing element. The handle area preferably has a shape adjusted to the palm of a user. The support element is advantageously designed with a shape and material elasticity that allows it to be easily affixed to the handle area. While the substance-to-substance connection between the handle area and support element is preferably established through adhesive bonding, or in a hot embossing process, a positive connection between the handle area and support element is also inventive, in particular one generated by an in-mold process. The conductor elements are advantageously made out of an electrically conductive material, in particular out of carbon fibers or a metal material like silver, copper or aluminum, or out of an alloy of these materials. The at least three conductor elements preferably differ in shape, size, and arrangement, so that they are optimally adjusted to their respective function.

The conductor element designed as a heating element is advantageously arranged over the support element as uniformly and extensively as possible, so as to enable a uniform and high heat emission.

The conductor element designed as a temperature sensor element is preferably arranged on the support element in such a way that it can acquire the point or area with the highest or lowest temperature. An embodiment of the invention provides two or more temperature sensor elements, which are arranged at the point of the highest and lowest temperature, so as to render the highest temperature difference determinable. This makes it possible to advantageously determine an average temperature, and thus also to adjust the heat emission of the heating element that leads to a sufficient average temperature of the joystick handle area. In the embodiment of the invention with just one temperature sensor element, temperature response curves can be used to determine a temperature drop or rise over the support element, so that this embodiment also makes it possible to determine the average temperature and thereby adjust the heat emission of the heating element. The temperature sensor element is preferably designed as a PTC thermistor, in which the change in electrical resistance can be measured as a function of the temperature. An inventive use of a four-conductor connection of the temperature sensor element makes it possible to feed the measuring current separately, so that the influence of contact and line resistances can be compensated. Likewise inventive is the design of a conductor element that comprises the functions of a heating element and those of a temperature sensor element.

Designing at least one conductor element as a touch-sensing element advantageously makes it possible to reliably detect a user hand resting on the joystick handle. The touch-sensing element is flatly applied to the support element, thereby ensuring a detection even given different hand positions. According to the invention, the contact-sensing element is designed as a capacitive, inductive, optical, or resistive element, or as a temperature sensor element.

According to the invention, the conductor elements are printed onto a first lateral surface and/or a second lateral surface of the support element by means of a printing process, in particular by means of screen printing. In an advantageous manner, at least all functionally identical conductor elements are printed on a shared side. According to the invention, the support element is placed in a frame of a print form during the screen printing process. A template is then placed on the support element, which prevents coating at the positions not provided. The coating can be applied to the template and support element by means of a squeegee. After printing is complete, the support element is removed from the machine. According to the invention, the coating forms the conductor elements. Depending on the material of the conductor elements, a seal is applied to the support element to protect the conductor elements against outside influences and corrosion. Should it become necessary to change the conductor elements themselves or their arrangement on the support element, all that need be done is to create a new template for each lateral surface. The remaining production process remains unaffected, which results in a rapid and simple conversion, and thus a cost savings.

A further development of the invention provides that the support element be designed as a support film and/or be self-adhesive and/or heat resistant. In a particularly advantageous manner, the support film is designed with a flexibility that essentially allows it to be adjusted to the shape of the handle area. The invention also provides for arranging several support elements on a joystick for a largest possible functional area, wherein at least one support element is designed according to the invention, and an additional support element is designed with only one conductor element, in particular a heating element. According to the invention, the tensile and compressive strength of the support film is such that the essentially inelastic conductor elements arranged thereon are not destroyed during assembly. A self-adhesive design for the support element is especially advantageous, since no additional aids are required to arrange it on the handle area. Due to the rapid and simplified application, this reduces both production costs and material costs. According to the invention, the support element is arranged on the handle area by means of a punch or manually. A high heat resistance of the support element is particularly advantageous, since it is arranged directly on the heating element.

An embodiment of the invention provides that the support element have a web, wherein the web has formed on it ribs that are spaced apart and face away from each other. In this way, it can advantageously be bent around at least two axes without increasing the risk that the support element will fold or crack in the process. The support element can thus be adjusted to the contour of the handle area. According to the invention, first bends are formed on the web along first bending edges, and second bends on the robs along second bending edges, wherein the first bending edges are arranged orthogonally to the second bending edges.

The invention further provides an essentially meandering design for the at least one heating element, and a resultantly generated shielding for the at least one touch-sensing element against electromagnetic radiation. The heating element is designed as a slender line, which has a predefined resistance, so that electrical energy can be converted into heat during a controllable current flow through the heating element. In addition to uniformly dissipating heat, the uniform distribution of the heating element on the support element especially advantageously shields the touch-sensing element against electromagnetic radiation. As a result, the invention minimizes a negative external influencing of the functionality of the touch-sensing element.

An embodiment of the invention provides that the conductor elements each be connected with a control element, wherein the control element outputs control signals to the heating element as a function of the signals of the temperature sensor element and/or touch-sensing element and/or HMI. The measured values of the temperature sensor element can be used to achieve an individually adjustable temperature via the control element. In an embodiment, the temperature is regulated through an essentially stepless pulse width modulation. In another embodiment, the support element has at least two heating elements, which can be switched on or off, and thus vary the heat output of the support element. A temperature desired by a user can be configured via an HMI (human-machine interface). In an embodiment according to the invention, a hand is detected by the touch-sensing element, and a line to the heating element is closed by the control element. If no hand is detected, the line to the heating element is interrupted by the control element. The invention also provides for regulating the heating element independently of the touch-sensing element. According to the invention, the conductor elements are connected to the control element by way of ZIF or LIF plugs or crimpable plug contacts, wherein crimpable plug contacts advantageously have a higher current carrying capacity.

In an embodiment of the invention, the at least three conductor elements are comprised of identical materials. This simplifies the production process, and reduces the costs and production time, since a common production method can be used, and the at least three conductor elements can especially advantageously be applied to the support element in a common production step.

A further development of the invention provides that the conductor elements are coated, in particular with a carbon layer. Should the resistance value of the heating element be insufficient for reaching a sufficient heat output, the coating especially advantageously makes it possible to increase the line resistance, and hence to increase the heat output. Apart from a carbon layer, the invention also provides for other coatings that increase the line resistance.

BRIEF DESCRIPTION OF THE DRAWINGS

The invention will be explained in more detail below based on an exemplary embodiment by means of the figures, wherein.

DETAILED DESCRIPTION OF EXAMPLE EMBODIMENTS

Figure 1:
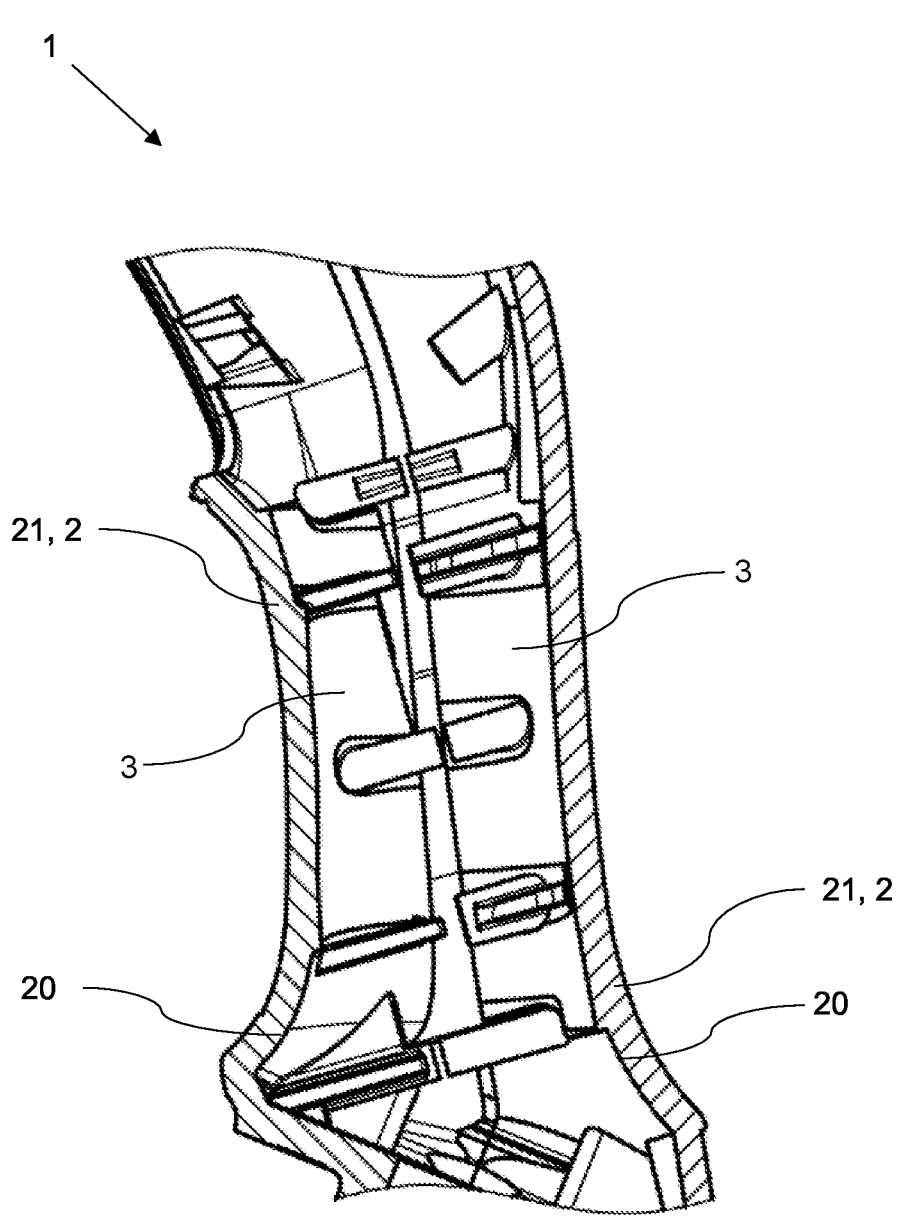
FIG. 1 shows a sectional view of a joystick, FIG. 2 an interior of a half-shell, FIG. 3 a side view of two support elements, FIG. 4 an exploded view of the support element and conductor elements, and FIG. 5 a graphic view of the electrical connections.

FIG. 1 shows a sectional view of a joystick 1, wherein the joystick 1 has a handle area 2 that consists of two half-shells 21, and has a respective support element 3 arranged on its interior surfaces 20. The first support element 3 is here arranged on a side of the handle area 2 facing the user, and the second support element 3 on a side facing away from the user. This arrangement makes it possible to detect and heat a palm of the user, as well as his or her inner finger surfaces that rest on the opposing side of the handle area 2 and roughly face the palm.

Figure 2:
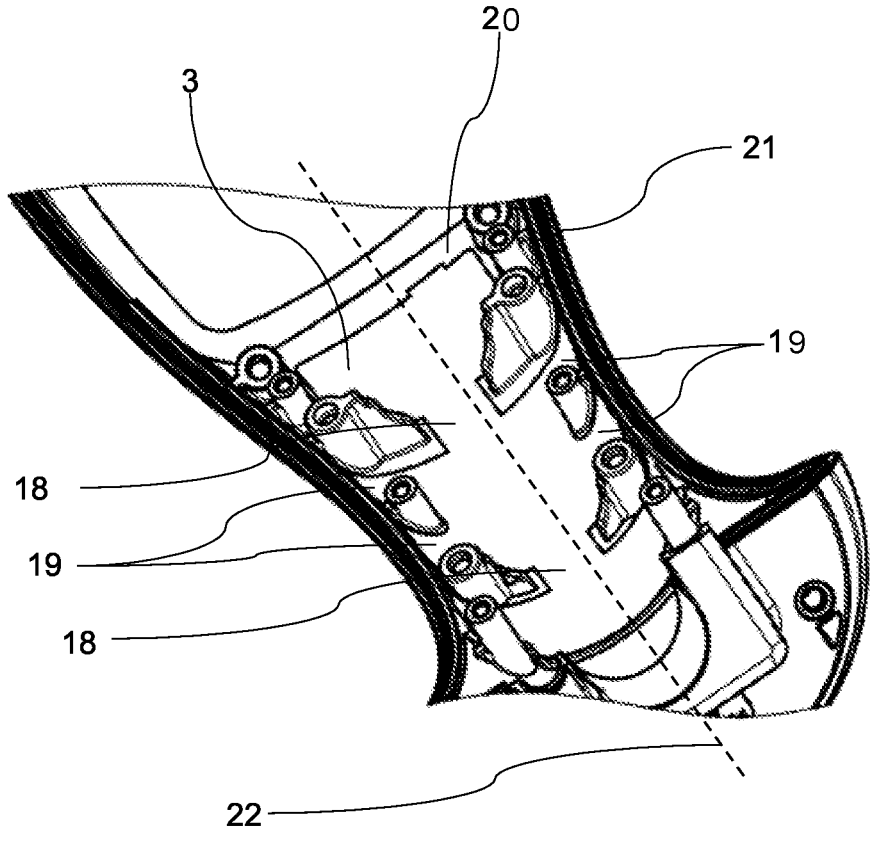

FIG. 2 shows an interior side of a half-shell 21, wherein the support element 3 is a self-adhesive support film that is adhesively bonded directly on the inner surface 20. The support element 3 has a web 18 with ribs 19 that are spaced apart and face away from each other. The ribs 19 have a three-dimensional pitch circle around a joystick axis 22.

Figure 3:
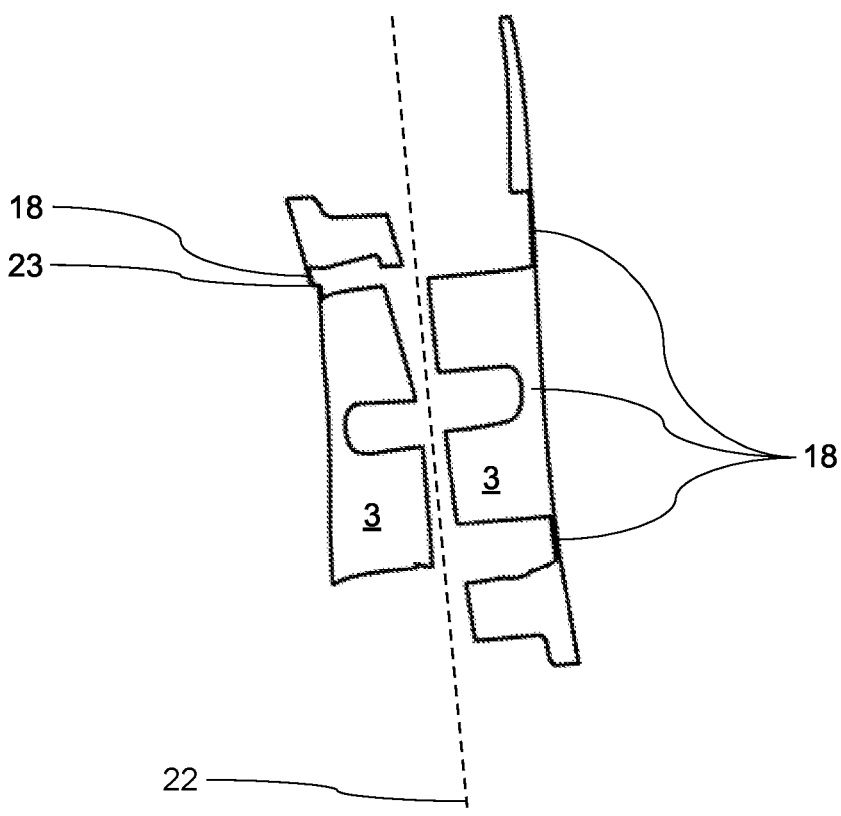

FIG. 3 shows a side view of two support elements 3, wherein their shape is matched to a respective shape of the undepicted half-shells 21. The web 18 of the left support element 3 has a staircase shape, wherein a bridge area 23 is formed to reduce and expand the radius in relation to the joystick axis 22. According to the invention, the web 18 can also have several bridge areas 23, and can thus be optimally adjusted to a shape of the undepicted inner surface 20. Therefore, an adjustment of the support element 3 to the essential shape of the handle area 2 is enabled, without damaging the support element 3. This design also inventively minimizes an undesired occurrence of folds on the support element 3.

Figure 4:
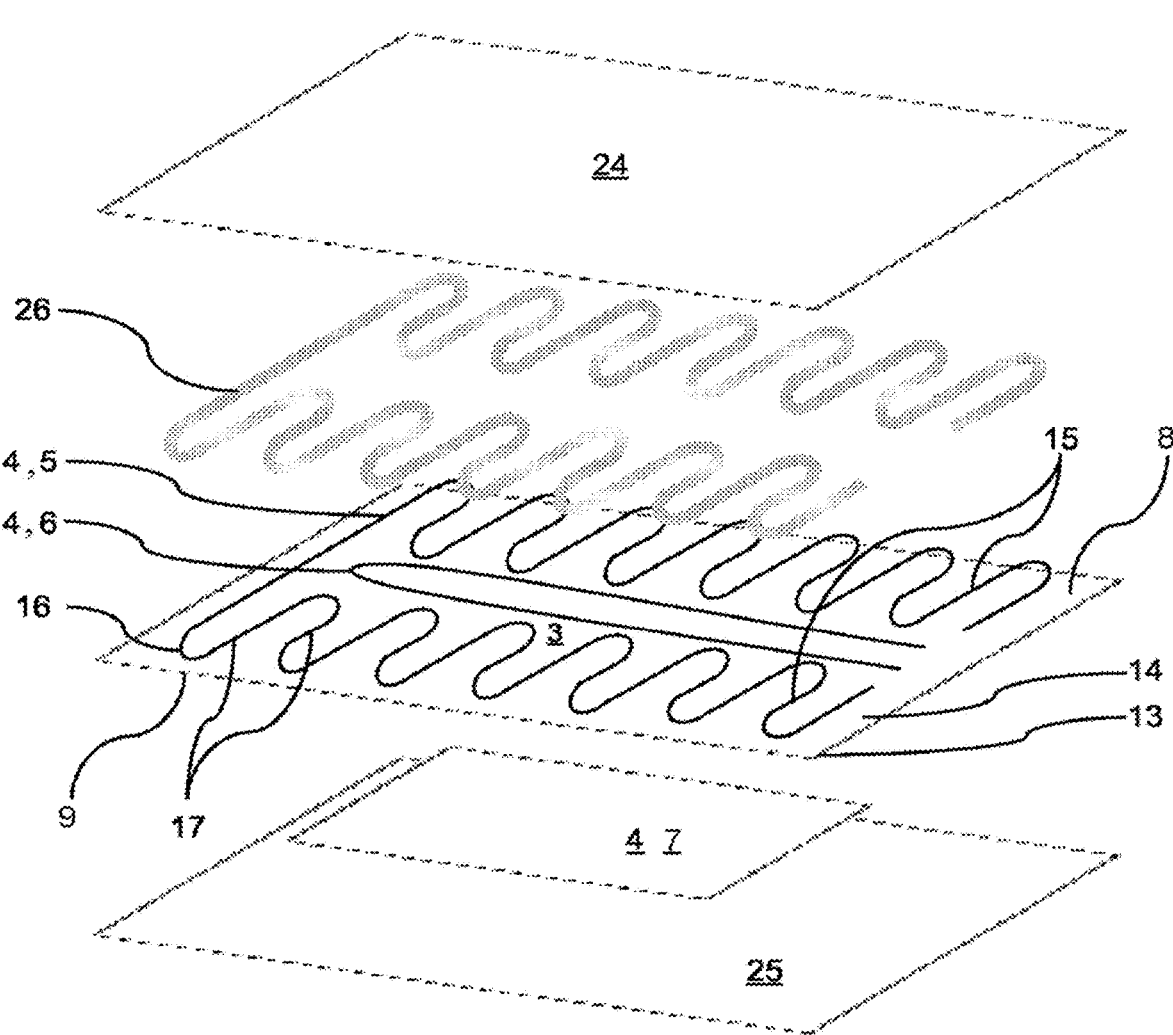

FIG. 4 shows an exploded view of a support element 3 according to the invention and the conductor elements 4, wherein a temperature sensor element 6 and a heating element 5 are printed on a first lateral surface 8, and a touch-sensing element 7 on a second lateral surface 9. The conductor elements 4 are arranged spaced apart from an edge area 14 formed on a circumference of the support element 3, except for their connection points (not shown). The conductor elements each have at least one undepicted connection point on a short lateral edge 13 of the support element 3, wherein according to the invention, the touch-sensing element 7 has a connection point, the heating element 5 has two connection points, and the temperature sensor element 6 has four connection points. The connection points are spaced apart from each other in such a way as to preclude an electrical connection between the individual conductor elements 4. The respective heating element 5 meanderingly runs along two strands 15, wherein the distance between two legs 17 of the heating element 5 is essentially identical. The temperature sensor element 6 is arranged in essentially a U-shaped manner between the two strands 15 in the middle of the support element 3. Therefore, the heating element 5 and the temperature sensor element 6 can both be arranged on the first lateral surface 8 without influencing each other's function. Since the touch-sensing element 7 is essentially fully formed so as to reliably detect the hand, it is separately arranged on the second lateral surface 9. In addition, the temperature sensor element 6 and the heating element 5 are arranged between the support element 3 and a corrosion protection element 24, wherein a coating 26 is introduced between the heating element 5 and corrosion protection element 24, and likewise is designed to meanderingly run along the progression of the heating element 5. The touch-sensing element 7 is arranged between the support element and an adhesive element 25.

Figure 5:
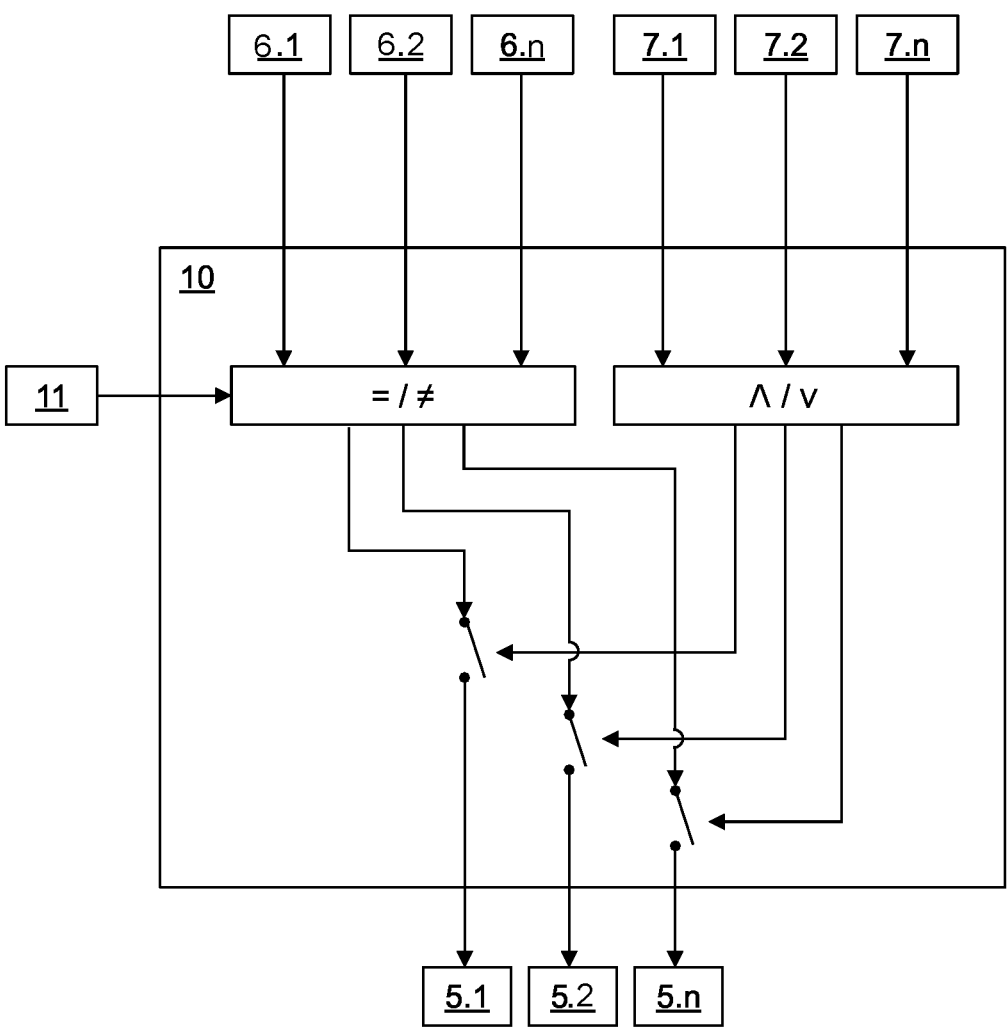

FIG. 5 shows a graphic view of the electrical connections inside of the joystick 1, wherein the measuring signals (6.1, 6.2, 6.n) of the temperature sensor elements 6 and the measuring signals (7.1, 7.2, 7.n) of the touch-sensing elements 7 are guided into the control element 10. In addition, the control element 10 receives signals from an HMI 11. Inside of the control element 10, the actual values for the temperature from the measuring signals of the temperature sensor elements 6 are on the one hand matched with the target values that can be individually set by a user inside of the HMI 11. Depending on whether the actual values match or deviate from the target values, corresponding control signals (5.1, 5.2, 5.n) from the control element 10 are routed to the respective heating elements 5. On the other hand, the measuring signals of the touch-sensing elements 7 are used inside of the control element 10 to detect whether a hand is touching the joystick 1. Depending on the logic of the control element 10, when one, several or all touch-sensing elements 7 register a hand, this causes the signal line from the control element 10 to the heating elements 5 to close. If no hand has been registered on the joystick 1, the switch is open, and the heating elements 5 cannot be actuated. The switch(es) can also be closed independently of the temperature sensor elements 6 via the HMI 11.

The invention claimed is:

1. A joystick for operating utility vehicles, which has a handle area, wherein the handle area has a substance-to-substance connection to a support element, wherein at least three conductor elements are arranged on the support element, wherein one conductor element of the at least three conductor elements is designed as at least one heating element, one conductor element of the at least three conductor elements is designed as at least one temperature sensor element, and one conductor element of the at least three conductor elements is designed as at least one touch-sensing element, and wherein the support element is designed as a support film.

2. The joystick according to claim 1, wherein the at least three conductor elements are printed onto a first lateral surface and/or a second lateral surface of the support element by a printing process.

3. The joystick according to claim 1, wherein the support element is self-adhesive and/or heat resistant.

4. The joystick according to claim 1, wherein the support element has a web, wherein the web has formed on it ribs that are spaced apart and face away from each other.

5. The joystick according to claim 1, wherein the at least one heating element is designed as a shielding for the at least one touch-sensing element against electromagnetic radiation.

6. The joystick according to claim 1, wherein the at least three conductor elements each are connected with a control element, wherein the control element outputs control signals to the at least one heating element as a function of the acquired signals of the at least one temperature sensor element and/or the at least one touch-sensing element and/or a human-machine interface (HMI).

7. The joystick according to claim 1, wherein the at least three conductor elements are made of identical material.

8. The joystick according to claim 1, wherein the at least three conductor elements are coated.

9. The joystick according to claim 2, wherein the printing process is screen printing.

10. The joystick according to claim 8, wherein the at least three conductor elements are coated with a carbon layer.

11. The joystick according to claim 1, wherein the support film is shape that matches a contour of the handle area.

12. The joystick according to claim 1, wherein the at least three conductor elements are inelastic.

* * * * *